US008275292B2

(12) United States Patent
Tomari et al.

(10) Patent No.: US 8,275,292 B2
(45) Date of Patent: Sep. 25, 2012

(54) EPICHLOROHYDRIN COMPOSITION FOR CONDUCTIVE ROLLER, CONDUCTIVE ROLLER, CHARGING UNIT, IMAGE FORMING APPARATUS, PROCESS CARTRIDGE, AND METHOD OF MANUFACTURING CONDUCTIVE ROLLER

(75) Inventors: Shogo Tomari, Kanagawa (JP); Ryuji Watanabe, Mie (JP)

(73) Assignee: Fuji Xerox Co., Ltd., Tokyo (JP)

( * ) Notice: Subject to any disclaimer, the term of this patent is extended or adjusted under 35 U.S.C. 154(b) by 212 days.

(21) Appl. No.: 12/695,528

(22) Filed: Jan. 28, 2010

(65) Prior Publication Data

US 2011/0052262 A1 Mar. 3, 2011

(30) Foreign Application Priority Data

Aug. 28, 2009 (JP) ................. 2009-198465

(51) Int. Cl.
*G03G 15/02* (2006.01)

(52) U.S. Cl. ...................................... 399/176

(58) Field of Classification Search ............... 399/176, 399/286, 174, 168, 313
See application file for complete search history.

(56) References Cited

U.S. PATENT DOCUMENTS

| 6,951,688 | B2 * | 10/2005 | Kato et al. ............... 428/413 |
| 2006/0252619 | A1 * | 11/2006 | Yamada et al. ............ 492/56 |
| 2006/0269327 | A1 * | 11/2006 | Mizumoto .............. 399/176 |
| 2009/0087212 | A1 * | 4/2009 | Ogura .................... 399/100 |

FOREIGN PATENT DOCUMENTS

| JP | A-2000-313769 | 11/2000 |
| JP | A-2005-295018 | 10/2005 |
| JP | A-2007-98896 | 4/2007 |

* cited by examiner

*Primary Examiner* — Quana M Grainger
(74) *Attorney, Agent, or Firm* — Oliff & Berridge, PLC

(57) ABSTRACT

A rubber composition for a conductive roller that has at least an elastic layer above an outer periphery of a shaft member having conductivity is provided, the rubber composition including: a binary epichlorohydrin rubber; and a vulcanizing agent that contains at least sulfur, wherein the rubber composition does not contain a quinoxaline vulcanizing agent and a triazine vulcanizing agent.

17 Claims, 4 Drawing Sheets

EPICHLOROHYDRIN COMPOSITION FOR CONDUCTIVE ROLLER, CONDUCTIVE ROLLER, CHARGING UNIT, IMAGE FORMING APPARATUS, PROCESS CARTRIDGE, AND METHOD OF MANUFACTURING CONDUCTIVE ROLLER

CROSS-REFERENCE TO RELATED APPLICATIONS

This application is based on and claims priority under 35 U.S.C. 119 from Japanese Patent Application No. 2009-198465 filed Aug. 28, 2009.

BACKGROUND

1. Technical Field

The present invention relates to a composition for conductive roller, a conductive roller, a charging unit, an image forming apparatus, a process cartridge, and a method of manufacturing a conductive roller.

2. Related Art

As the conductive roller that is installed into an image forming apparatus such as an electrophotographic apparatus, an electrostatic recording apparatus, or the like, typified by a copying machine, a printer, a facsimile machine, or the like, the electron conductive type conductive roller and the ion conductive type conductive roller, whose approaches of acquiring its electric resistance value are different, are known. Commonly the conductive roller has an elastic layer on an outer periphery of a conductive shaft body, and the elastic layer contains a rubber composition. In order to acquire a predetermined desired resistance value, in the electron conductive type conductive roller, the rubber composition is manufactured by mixing/dispersing conductive particles such as the carbon black, the metal oxide, or the like, for example, into the rubber material, or the like. At this time, the resultant resistance value depends greatly on a dispersed state of the conductive particles in the rubber composition.

Owing to the above circumstances, normally the ion conductive type conductive roller is mostly employed as the conductive roller that is installed into the image forming apparatus. As an example of the ion conductive type conductive roller, the roller whose elastic layer contains the rubber composition that consists of a copolymer of ethylene oxide and epichlorohydrin, a polymer such as an acrylonitrile-butadiene copolymer rubber, or the like may be listed. Since the rubber composition has a small variation in an electric resistance and a desired resistance value is obtained stably, the ion conductive type conductive roller is suitable for the image forming apparatus.

As an example of the epichlorohydrin rubber used in the conductive roller, a ternary copolymer (DECO) consisting of epichlorohydrin (ECH), ethylene oxide (EO), and allyl glycidyl ether (AGE) is listed. The ternary copolymer containing the epichlorohydrin rubber may be vulcanized by various sulfur-based vulcanizing agents. Since a vulcanization rate may be easily adjusted by changing its combination, various sulfur-based vulcanizing agents are excellent in workability. However, since the allyl glycidyl ether unit part, in which the vulcanization action is executed, of the ternary epichlorohydrin rubber is expensive, it is feared that a material cost is increased.

SUMMARY

According to an aspect of the present invention, there is provided a rubber composition for a conductive roller that has at least an elastic layer above an outer periphery of a shaft member having conductivity, the rubber composition including:

a binary epichlorohydrin rubber; and a vulcanizing agent that contains at least sulfur, wherein the rubber composition does not contain a quinoxaline vulcanizing agent and a triazine vulcanizing agent

BRIEF DESCRIPTION OF THE DRAWINGS

Exemplary embodiment of the present invention will be described in detail based on the following figures, wherein.

DETAILED DESCRIPTION

Figure 1:
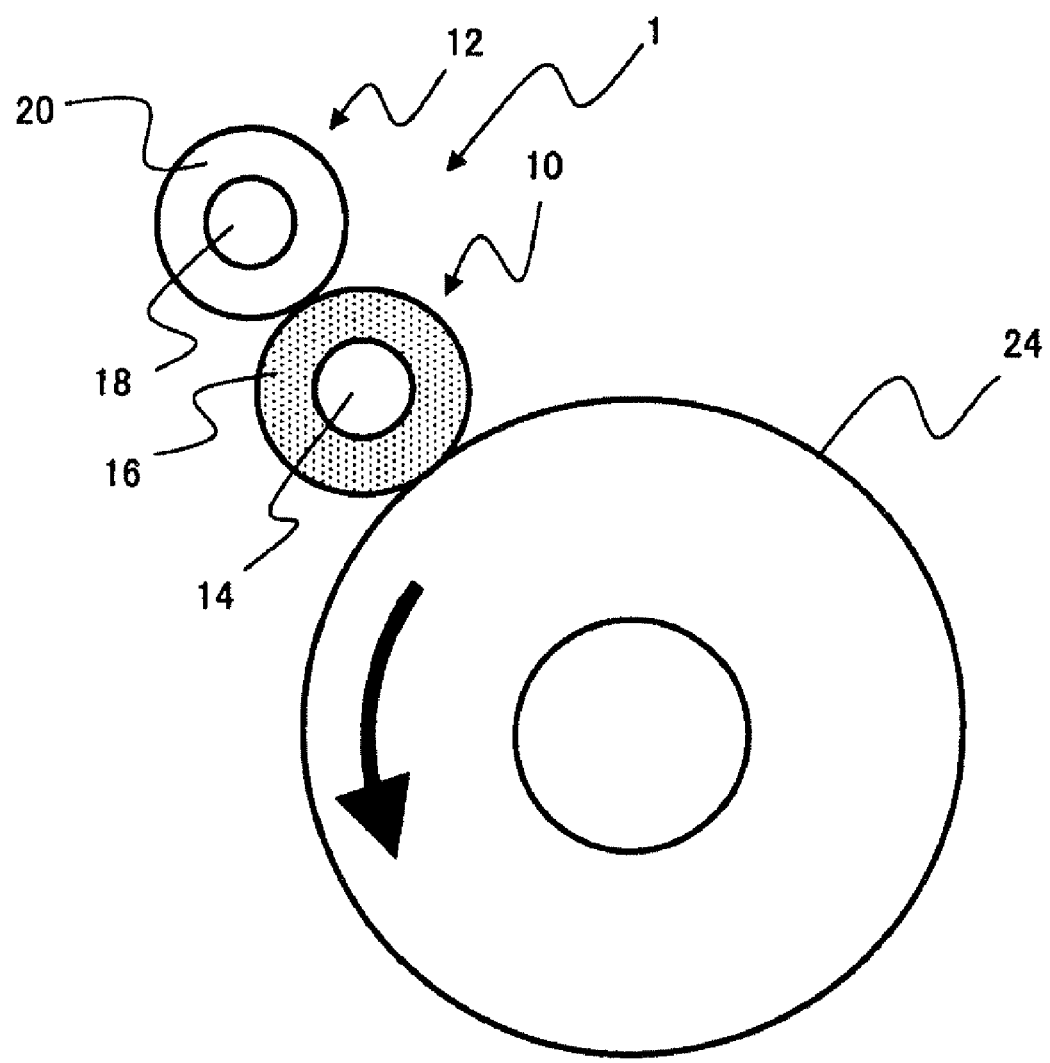
FIG. 1 is a side view showing a schematic configuration of an example of a charging unit using a conductive roller according to an exemplary embodiment of the present invention.

An exemplary embodiment of the present invention will be explained hereinafter. The present exemplary embodiment shows merely an example that carries out the present invention, and the present invention is never limited to the present exemplary embodiment.

The rubber composition for conductive roller according to the exemplary embodiment of the present invention contains at least the binary epichlorohydrin rubber as a main component but does not contain the quinoxaline vulcanizing agent or the triazine vulcanizing agent, and contains the vulcanizing agent including at least sulfur. Since the rubber composition for conductive roller does not contain the quinoxaline-based vulcanizing agent and the triazine-based vulcanizing agent, a vulcanization rate in the vulcanizing step in the manufacture is suppressed to the controllable level. Also, a vulcanization rate in the vulcanizing step is adjusted to the desirable extent by changing the type and an amount of composition of the vulcanizing agent that emits sulfur.

In the exemplary embodiment of the present invention, the binary epichlorohydrin rubber may be a copolymer that consists of the epichlorohydrin and the ethylene oxide. This binary epichlorohydrin rubber is vulcanized by sulfur that the vulcanizing agent emits.

In the exemplary embodiment of the present invention, the thiuram vulcanizing agent is listed as the vulcanizing agent that emits sulfur. As the thiuram vulcanizing agent, for example, thiuram sulfide compounds such as tetramethyl thiuram monosulfide, tetramethyl thiuram disulfide, tetraethyl thiuram disulfide, tetrabuthyl thiuram monosulfide, tetrabuthyl thiuram monosulfide, tetrabuthyl thiuram disulfide, N,N'-dimethyl-N,N'-diphenyl thiuram disulfide, dipentamethylene thiuram monosulfide, dipentamethylene thiuram disulfide, dipentamethylene thiuram tetrasulfide, dipentamethylenethiuramhexasulfide, and the like may be listed. But the thiuram vulcanizing agent is not limited to them. The thiuram vulcanizing agent may be compounded at a ratio of 0.5 or about 0.5 part by weight or more but 15 or about 15 parts by weight or less, preferably at a ratio of 2.0 parts by weight or more but 10 parts by weight or less, with respect to 100 parts by weight of the binary epichlorohydrin rubber or 100 parts by weight of the blend consisting of the binary epichlorohydrin rubber and a liquid acrylonitrile-butadiene copolymer rubber. One type or two types of thiuram vulcanizing agent may be compounded. When a total sum of one type or two types of compounded thiuram vulcanizing agent is below 0.5 part by weight, in some cases the vulcanization is insufficient. In contrast, when a total sum of the thiuram vulcanizing agent is in excess of 15 parts by weight, a vulcanization rate is accelerated and then the vulcanization proceeds at a molding temperature, and in some cases the moldability is influenced.

The rubber composition for conductive roller according to the exemplary embodiment of the present invention further contains the acrylonitrile-butadiene copolymer rubber (NBR), and also the blend consisting of the binary epichlorohydrin rubber and the acrylonitrile-butadiene copolymer rubber may be employed. As the acrylonitrile-butadiene copolymer rubber that may be contained in the rubber composition for conductive roller, middle nitryl, middle-high nitryl, high nitryl, and ultra-high nitryl are listed. It is preferable that the liquid acrylonitrile-butadiene copolymer rubber contains the liquid acrylonitrile-butadiene copolymer rubber. The liquid acrylonitrile-butadiene copolymer rubber gives fluidity to the rubber in the extrusion molding to improve the extrusion moldability, and makes it easy to obtain the cylindrical shape with desired molding precision.

The liquid acrylonitrile-butadiene copolymer rubber is inferior in reactivity. Therefore, the liquid acrylonitrile-butadiene copolymer rubber is compounded in the rubber composition for conductive roller, it is commonly possible that the liquid acrylonitrile-butadiene copolymer rubber that does not contribute to the vulcanization bleeds from the vulcanized elastic layer. In contrast, in the rubber composition for conductive roller according to the exemplary embodiment of the present invention, the vulcanizing agent emits sulfur is employed, so that occurrence of the bleed of the liquid acrylonitrile-butadiene copolymer rubber from the vulcanized elastic layer is suppressed. The reason for this may be considered such that the bleed of the liquid acrylonitrile-butadiene may be suppressed by the crosslink of the liquid acrylonitrile-butadiene caused by the sulfur emitted from the sulfur-based vulcanization accelerator. In the present exemplary embodiment, a compound ratio of the binary epichlorohydrin rubber (A) and the liquid acrylonitrile-butadiene copolymer rubber (B) is set to (A):(B)=about 95:5 to about 70:30, more particularly (A):(B)=about 90:10 to about 80:20 in weight rate. When a compound ratio of the binary epichlorohydrin rubber (A) is increased higher than (A):(B)=about 95:5, in some cases an effect of relaxing a stress by the compound of the liquid acrylonitrile-butadiene copolymer rubber (B) may not be sufficiently exhibited. When a compound ratio of the liquid acrylonitrile-butadiene copolymer rubber (B) is increased higher than (A):(B)=about 70:30, it is feared that the bleed is caused by the liquid acrylonitrile-butadiene copolymer rubber.

The rubber composition for conductive roller according to the exemplary embodiment of the present invention may further contain an ion conducting agent including an ion conductive substance. As the ion conductive substance, an organic ion conductive substance is preferable from an aspect of dispersibility.

In the exemplary embodiment of the present invention, as the organic ion conductive substance, quaternary ammonium salt (e.g., lauryl trimethyl ammonium, stearyl trimethyl ammonium, octadodecyl trimethyl ammonium, dodecyl trimethyl ammonium, hexadecyl trimethyl ammonium, perchlorate such as denatured fatty acid.dimethylethyl ammonium, or the like, chlorate, hydrorate borofluoride, sulfate, ethosulfate, benzyl halides (benzyl bromide, benzyl chloride, etc.), etc.), aliphatic sulfonate, higher alcohol sulfate ester, higher alcohol ethylene oxide added sulfate ester, higher alcohol phosphate, higher alcohol ethylene oxide added phosphate, various betaines, higher alcohol ethylene oxide, polyethylene glycol aliphatic ester, polyhydric alcohol aliphatic ester, and the like may be listed.

Also, as the organic ion conductive substance, the complex consisting of polyhydric alcohol (1,4 butanediol, ethylene glycol, polyethylene glycol, propylene glycol, polyethylene glycol, or the like) and its derivative and metallic salt, and the complex consisting of monool (ethylene glycol monomethyl ether, ethylene glycol monoethyl ether, or the like) and metallic salt may be listed. As the metallic salt, for example, the metallic salt in the first group in the periodic table such as $LiClO_4$, $LiCF_3SO_3$, $LiAsF_6$, $LiBF_4$, $NaClO_4$, NaSCN, KSCN, NaCl, or the like; the electrolyte such as salt of $NH^{4+}$; the metallic salt in the second group in the periodic table such as $Ca(ClO_4)_2$, $Ba(ClO_4)_2$, or the like; the metallic salt that possesses the group having the active hydrogen that reacts with at least one or more of the isocyanates such as hydroxyl group, carboxyl group, first or second class amine group, etc., and the like may be listed. Concretely, PEL (the complex of $LiClO_4$ and polyethylene glycol), and the like may be listed as such complex. These organic ion conducting substances may be employed solely or the combination of two types of substances may be employed. In the exemplary embodiment of the present invention, predetermined adequate conductivity may be given to the rubber composition, by mixing the organic ion conducting substance at a rate of 0.5 or about 0.5 part by weight or more but 15 or about 15 parts by weight or less, preferably at a rate of 0.5 part by weight or more but 3.0 parts by weight or less, with respect to 100 parts by weight of the binary epichlorohydrin rubber or 100 parts by weight of the blend consisting of the binary epichlorohydrin rubber and a liquid acrylonitrile-butadiene copolymer rubber. In contrast, when the compound ratio of the organic ion conducting substance is below 0.5 part by weight with respect to 100 parts by weight of the binary epichlorohydrin rubber or 100 parts by weight of the blend 100 consisting of the binary epichlorohydrin rubber and the liquid acrylonitrile-butadiene copolymer rubber, a variation in conductivity is caused and sometimes the stable charging characteristic may not be obtained. When the compound ratio of the organic ion conducting substance is in excess of 15 parts by weight, in some cases the bleed is caused.

In the rubber composition for conductive roller according to the exemplary embodiment of the present invention may further contain an acid accepting agent. As the acid accepting agent, the metallic compound and/or the hydrotalcite series may be employed. In the exemplary embodiment of the present invention, when the metallic compound as the acid accepting agent used in the rubber composition for conductive roller is illustrated, there are oxides of second group elements (alkaline earth metals) in the periodic table, hydroxide, carbonate, carboxylate, silicate, borate, phosphite, oxides of fourth group elements in the periodic table, basic carbonate, basic carboxylate, basic phosphite, tribasic sulfate, etc. as these compounds. Concretely, magnesium oxide, magnesium hydroxide, barium hydroxide, magnesium carbonate, barium carbonate, calcium oxide, calcium hydroxide, calcium hydroxide, calcium silicate, calcium stearate, zinc stearate, calcium phthalate, calcium phosphite, zinc white, tin oxide, tin stearate, basic tin phosphite, etc. may be listed.

In the rubber composition for conductive roller according to the exemplary embodiment of the present invention, the acid accepting agent is employed in a range of 0.5 or about 0.5 to 20 or about 20 parts by weight, preferably 3 to 10 parts by weight with respect to 100 parts by weight of the binary epichlorohydrin rubber 100 or 100 parts by weight of the blend consisting of the binary epichlorohydrin rubber and a liquid acrylonitrile-butadiene copolymer rubber. In contrast, when the compound ratio of the acid accepting agent is below 0.5 part by weight with respect to 100 parts by weight of the binary epichlorohydrin rubber or 100 parts by weight of the blend consisting of the binary epichlorohydrin rubber and the liquid acrylonitrile-butadiene copolymer rubber, a variation in vulcanization is caused and sometimes the stable vulcanized material may not be obtained. When the compound ratio of the acid accepting agent is in excess of 20 parts by weight, the rubber hardness is enhanced and in some cases the adequate charging characteristics are not obtained.

Charging Member and Charging Unit

Figure 2:
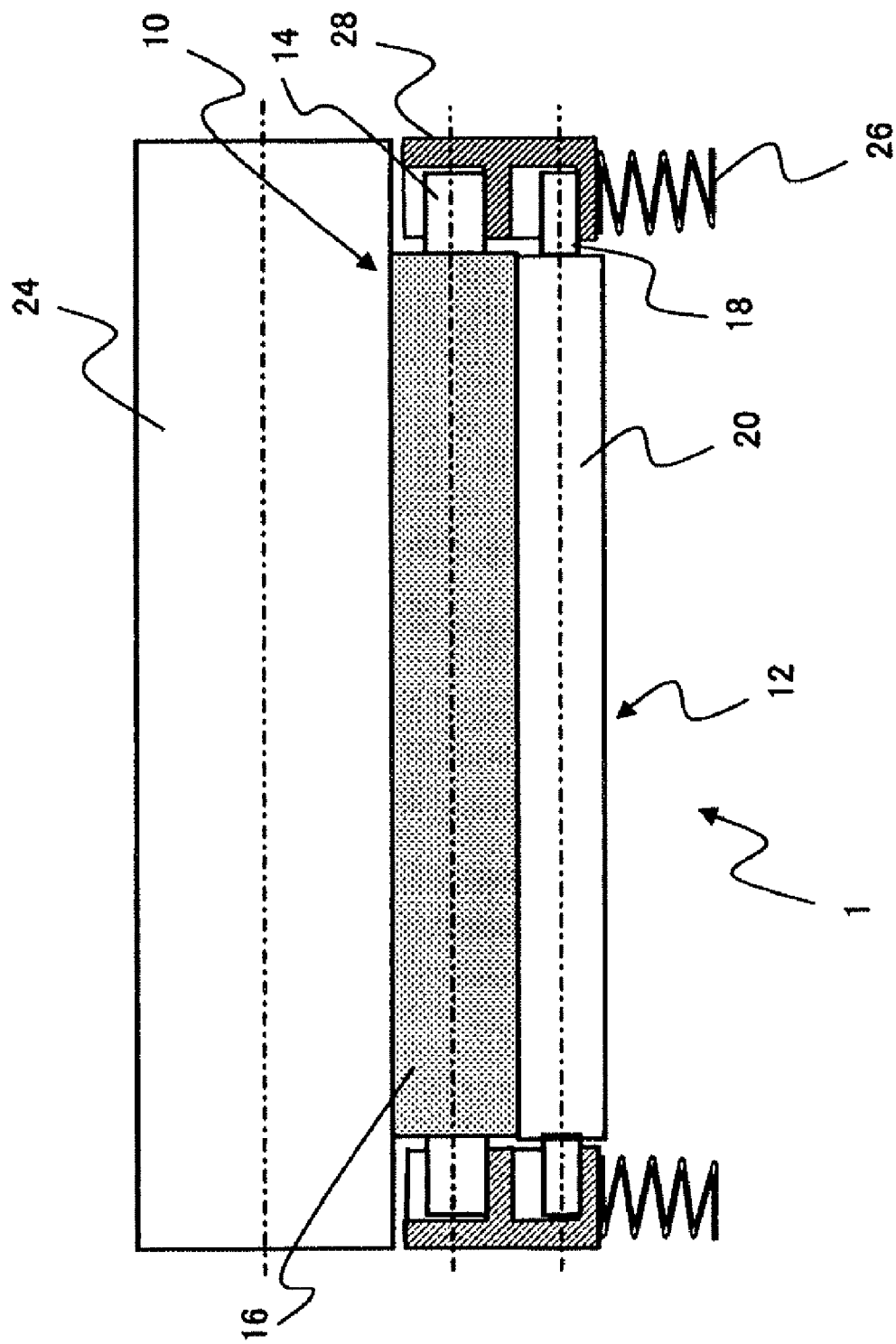
FIG. 2 is a front view showing the schematic configuration of the example of the charging unit using the conductive roller according to the exemplary embodiment of the present invention.

FIG. 1 is a side view showing a schematic configuration of an example of a charging unit using a charging roller according to the present exemplary embodiment. Also, FIG. 2 is a front view showing the schematic configuration of the example of the charging unit using the charging roller according to the present exemplary embodiment. A charging unit 1 in FIG. 1 is the charging member that charges a surface of an image holding body provided to the image forming apparatus, and is equipped with a charging roller 10 serving as the cylindrical charging member that is rotated on a shaft, and a cleaning roller 12 serving as the charging member cleaning member that contacts the charging roller 10 and cleans the surface of the charging roller 10. The charging roller 10 is the conductive roller that has a conductive shaft member 14, and a charging layer 16 formed on an outer periphery of the conductive shaft member 14. The charging layer 16 has a conductive elastic layer, and a surface layer, or the like is formed thereon as the case may be. The cleaning roller 12 has a core body 18, and a cylindrical elastic layer 20 formed on an outer periphery of the core body 18.

As shown in FIG. 2, in the charging unit 1, the charging roller 10 is pushed against a surface of a photosensitive body 24 by a resilient member such as a coil spring 26 that is provided to both end portions of the conductive shaft member 14 respectively, or the like, and is rotated to follow the photosensitive body 24. In contrast, the cleaning roller 12 is held by bearings 28 at a distance that is given by the bearings of the conductive shaft member 14 of the charging roller 10 and the core body 18 of the cleaning roller 12. The cleaning roller 12 is rotated to follow the charging roller 10 while cutting into the charging roller 10 by a predetermined depth. In this case, the charging roller 10 and the cleaning roller 12 may be rotated to follow the photosensitive body 24 and the charging roller 10 respectively, or may be driven separately.

A diameter of the charging roller 10 is set preferably to $\phi$ 8 mm or more but $\phi$ 15 mm or less, more preferably to $\phi$ 9 mm or more but $\phi$ 14 min or less. It is preferable that a thickness of the charging layer 16 is set to 1.5 mm or more but 4 mm or less. When the diameter exceeds 15 mm, the number of times the peripheral surface per one location contacts the foreign substance is decreased, and the number of times of discharge is decreased. Therefore, such charging roller is excellent in long term stability to the contamination and the charging performance, but such charging roller is disadvantageous from an aspect of size reduction. When the diameter is below 8 mm, such charging roller is excellent in size reduction of the image forming apparatus, and the like, but the number of times the peripheral surface per one location contacts the foreign substance is increased and the number of times of discharge is increased. Therefore, such charging roller is disadvantageous in the long term stability.

As the material of the conductive shaft member 14, the free-cutting steel, the stainless steel, and the like are employed. The material and the surface treatment method may be chosen appropriately in response to the application such as slideability, or the like. Also, the material having no conductivity may be processed by the common process such as the plating process, or the like to apply the conducting process.

The elastic layer constituting the charging layer 16 of the charging roller 10 is constructed to contain the rubber composition for conductive roller mentioned above according to the exemplary embodiment of the present invention. As the case may be, the material that is ordinarily added to the rubber, e.g., softening agent, plasticizer, curing agent, vulcanization accelerator, antioxidant, filler such as silica and calcium carbonate, or the like, etc. may be added. The charging layer 16 is formed by coating the mixture, into which the materials that are commonly added into the rubber are added, on the circumferential surface of the conductive shaft member 14.

The surface layer that the charging layer 16 may possess further is formed to prevent the contamination caused by foreign substances. As the material of the surface layer, any material such as resin, rubber, or the like may be employed, and such material of the surface layer is not particularly limited. For example, polyester, polyimide, copolymer nylon, silicon resin, acrylic resin, poly(vinyl butyral), ethylene tetrafluoroethylene copolymer, melamine resin, fluorine-containing rubber, epoxy resin, polycarbonate, poly(vinyl alcohol), cellulose, poly(vinylidene chloride), poly(vinyl chloride), polyethylene, ethylene vinylacetate copolymer, and the like may be listed.

Out of them, from an aspect of preventing the contamination caused by the external additive contained in the developer, poly (vinylidene fluoride), tetrafluoroethylene copolymer, polyester, polyimide, and copolymer nylon are employed preferably. The copolymer nylon contains any one or plural types of 610 nylon, 11 nylon, 12 nylon as unit of polymerization. As another unit of polymerization contained in this copolymer, 6 nylon, 66 nylon, or the like may be listed. Here, it is preferable that a rate at which units of polymerization consisting of 610 nylon, 11 nylon, and 12 nylon are contained in the copolymer is set to exceed 10 weight % as a total weight ratio. When the unit of polymerization is in excess of 10 weight %, the liquid mixability and the film formability in coating the surface layer are excellent. In particular, when the surface layer is used repeatedly, the wear of the resin layer and the adhesion of the foreign substance onto the resin layer are reduced, the durability of the roller is excellent, and a change of the characteristics due to the environment is reduced.

The polymer material may be employed singly or the mixture of two types of the polymer material may be employed. Also, a numerical mean molecular weight of the polymer material is set preferably in a range of 1,000 or more but 100,000 or less, more preferably in a range of 10,000 or more but 50,000 or less.

Also, the resistance value may be controlled by including the conductive material in the surface layer. As the conductive material, the material whose grain diameter is 3 μm or less is preferable.

Also, as the conducting agent used for the purpose of adjusting the resistance value, the conducting agent in which the material such as the carbon black or the conductive metal oxide particle compounded in the matrix material, the ion conducting agent, or the like, which electrically conducts at least one of the electron and the ion as the charge carrier, and others may be employed.

As the carbon black of the conducting agent, concretely "Special Black 350" manufactured by Degussa Corporation, "Special Black 100" manufactured by the same, "Special Black 250" manufactured by the same, "Special Black 5" manufactured by the same, "Special Black 4" manufactured by the same, "Special Black 4A" manufactured by the same, "Special Black 550" manufactured by the same, "Special Black 6" manufactured by the same, "Color Black FW200" manufactured by the same, "Color Black FW2" manufactured by the same, "Color Black FW2V" manufactured by the same, "MONARCH 1000" manufactured by Cabot Corporation, "MONARCH 1300" manufactured by the same, "MONARCH 1400" manufactured by the same, "MOGUL-L" manufactured by the same, "REGAL 400R" manufactured by the same, and the like are listed.

It is preferable that the above carbon black is less than pH 4.0. In contrast to the normal carbon black, the dispersibility into the resin composition is good on account of the effect of the oxygen containing functional group that exists on the surface. Therefore, charging uniformity is improved by mixing the above carbon black whose pH is 4.0 or less, and a variation of the resistance value is suppressed.

As the conductive metal oxide particles as the conductive particles used to adjust the resistance value, any conductive particles containing the particles having the conductivity, e.g., tin oxide, antimony-doped tin oxide, zinc oxide, anatase-type titanium oxide, indium tin oxide (ITO), and the like may be employed if the conducting agent uses the electron as the charge carrier. The conductive particles are not particularly limited. These conductive particles may be employed solely or two types or more may be employed in combination. Also, any particle diameter may be employed unless the conducting agent disturbs the effect of the present exemplary embodiment. In this case, from the aspects of resistance value adjustment and strength, tin oxide, antimony-doped tin oxide, and anatase-type titanium oxide are preferable, and tin oxide and antimony-doped tin oxide are more preferable.

When resistance control is applied by using such conductive material, the resistance value of the surface layer is not change according to the environmental conditions, and the stable characteristic are obtained.

Also, a fluorine-based resin, a silicon-based resin, etc. may be employed as the surface layer. In particular, it is preferable that the surface layer may be formed to contain the fluorine-denatured acrylate polymer. Also, the particles may be added into the surface layer. Accordingly, the surface layer becomes hydrophobicity, and the adhesion of the foreign substance onto the charging roller 10 is prevented. Also, unevenness is produced on the surface of the charging roller 10 by adding the insulating particles such as alumina, silica, or the like, and the burden on the charging roller 10 in sliding on the photosensitive body 24 is reduced, so that the wear resistance of the charging roller 10 with respect to the photosensitive body 24 may be improved.

In the conductive roller or the charging roller according to the present exemplary embodiment, the elastic layer may be formed by extruding the unvulcanized rubber composition for conductive roller contains the rubber composition, which not contains the quinoxaline vulcanizing agent and the triazine vulcanizing agent but contains the binary epichlorohydrin rubber and contains the vulcanizing agent that includes at least sulfur, by using the extruder while causing the shaft body to continuously pass through the cross head die of the extruder in such a manner that the unvulcanized rubber composition is arranged on the outer periphery of the shaft body to form the roller shape, and then applying the vulcanizing step to the rubber composition.

Next, the cleaning roller 12 will be explained hereunder.

As the material of the core body 18 of the cleaning roller 12, the free-cutting steel, the stainless steel, etc. are employed, and the material and the surface treatment process may be selected appropriately according to the application such as slidability, or the like. The electrically conducting process may be applied to the material, which has no conductivity, by the common process such as the plating process, or the like. Of course, such material having no conductivity may be employed as it is. Also, it is preferable that, in order to bring the cleaning roller 12 into contact with the charging roller 10 via the elastic layer 20 by an adequate pressing force, the material that has enough strength to cause no deflection during the pressing contact or the shaft diameter that has enough rigidity with respect to a shaft length should be chosen.

The elastic layer 20 is constructed to contain the foam that has a three-dimensional porous structure. For example, the foam is selected from the cellular resin such as polyurethane, polyethylene, polyamide, polypropylene, or the like, the material such as nitrile rubber (NBR), ethylene-propylene-diene ternary copolymer rubber (EPDM), styrene-butadiene rubber (SBR), silicon rubber, or the like, and others. In order to clean effectively the foreign substances by the following friction to the charging roller 10, to prevent a scratch that is caused on the surface of the charging roller 10 by the rubbing of the elastic layer 20, and not to produce the tearing or breaking of the elastic layer 20 for a long term, at least one of polyurethane, nitrile rubber, ethylene-propylene-diene ternary copolymer rubber, styrene-butadiene rubber, and silicon rubber, which is resistant to the tearing or stretching, is employed preferably as the elastic layer 20, and polyurethane is employed more preferably.

No particular limitation is imposed on the polyurethane. Any polyurethane may be employed if the reaction between the polyol such as polyesterpolyol, polyetherpolyester, acrylpolyol, or the like, and the isocyanate such as 2,4-tolylenediisocyanate, 2,6-tolylenediisocyanate, 4,4-diphenylmethanediisocyanate, tolidinediisocyanate, 1,6-hexamethylenediisocyanate, or the like is caused. Also, it is preferable that a chain extending agent such as 1,4-butanediol, trimethylolpropane, or the like is mixed. Also, it is common that a foaming action is caused by using azo compound such as azodicarbonamide, azobisisobutyronitrile, or the like or water as a foaming agent. Also, an auxiliary agent such as foaming aid, foam stabilizer, catalyst, or the like may be added as occasion demands.

Process Cartridge

The process cartridge according to the exemplary embodiment of the present invention is equipped with an image holding body, and the charging roller for charging the surface of the image holding body. The process cartridge of the present exemplary embodiment may have at least one type chosen from a group that consists of a charging member cleaning member that cleans a charging member, a latent image forming part that forms a latent image on a surface of the charged image holding body, a developing part that develops the latent image formed on the surface of the image holding body by the toner to form a toner image, a transferring part that transfers the toner image formed on the surface of the image holding body on a transferred body, and an image holding body cleaning member that cleans the surface of the image holding body after the transfer, as the case may be.

Figure 3:
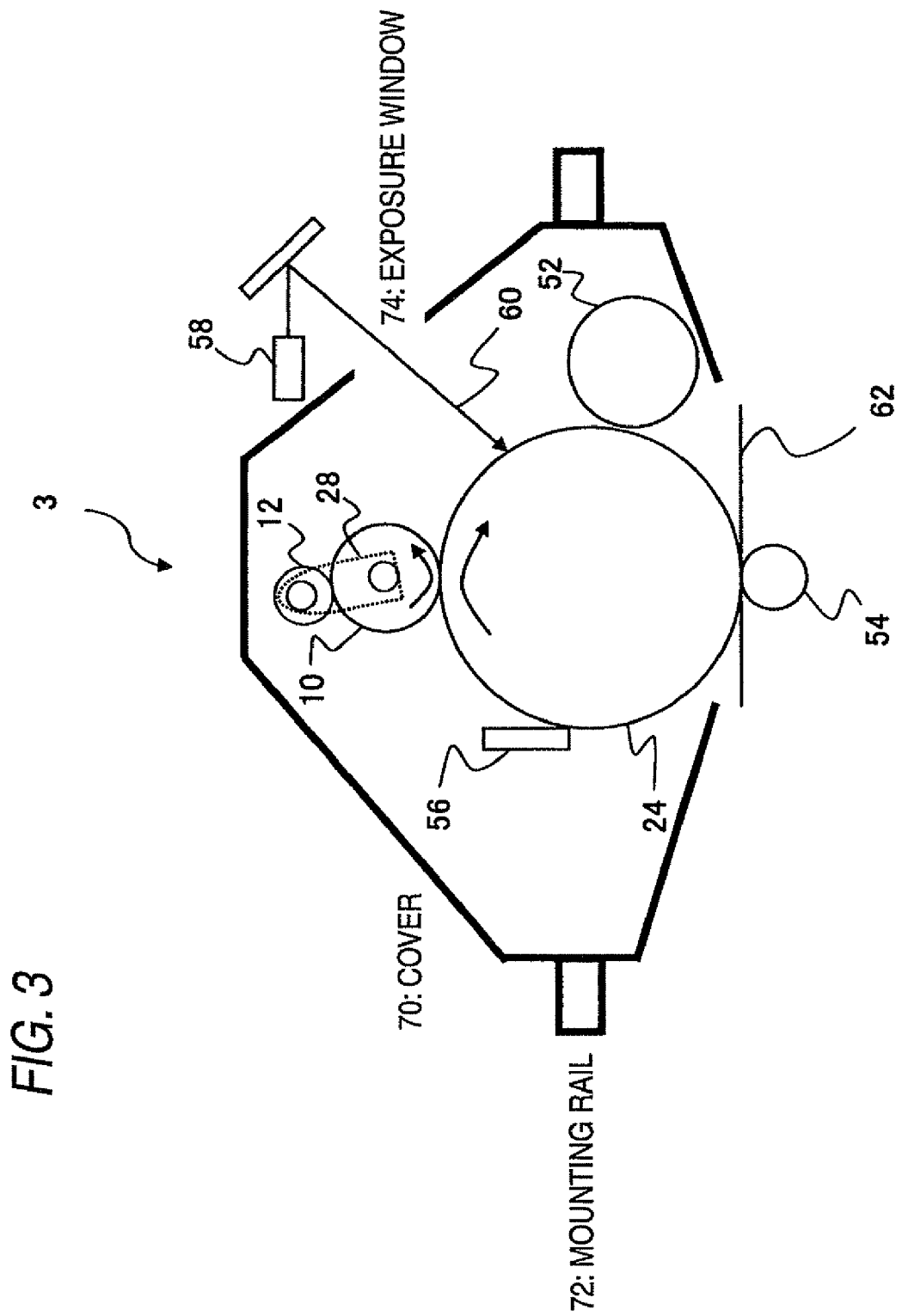
FIG. 3 is a schematic configurative view showing an example of a process cartridge according to an exemplary embodiment of the present invention.

A schematic configuration of the process cartridge according to the present exemplary embodiment is shown in FIG. 3, and its configuration will be explained hereunder. In a process cartridge 3, the photosensitive body (electrophotographic photosensitive body) 24 as the image holding body on which the electrostatic latent image is formed, the cylindrical charging roller 10 as the charging member that charges the surface of the photosensitive body 24 by contact, the cleaning roller 12 as the cleaning member that cleans the surface of the charging roller 10 while contacting the charging roller 10, a developing roller 52 as the developing part that causes the toner to adhere to the electrostatic latent image being formed on the surface of the photosensitive body 24 to form the toner image, and a cleaning blade 56 as the image holding body cleaning member that cleans the toner left on the photosensitive body 24 after the transfer, and the like while contacting the surface of the photosensitive body 24 are supported integrally in the cover 70, and the process cartridge 3 is detachably attached to the image forming apparatus by the mounting rail 72. When this process cartridge is loaded into the image forming apparatus, the charging roller 10, an exposure unit 58 as the latent image forming part that forms the electrostatic latent image on the surface of the photosensitive body 24 by a laser beam, a reflected light from the original, or the like, the developing roller 52, a transferring roller 54 as the transferring part that transfers the toner image formed on the surface of the photosensitive body 24 onto a recording paper 62 as the transferred body, and the cleaning blade 56 are arranged around the photosensitive body 24 in this order through the exposure window 74 placed at the cover 70. As described above, the charging roller 10 has the elastic layer on an outer periphery of the shaft member that has at least the conductivity. The elastic layer contains the rubber composition that not contains a quinoxaline vulcanizing agent and a triazine vulcanizing agent but contains the binary epichlorohydrin rubber, and contains a vulcanizing agent that includes at least sulfur. In this case, the illustration of functional units that are ordinarily necessary for other electrophotographic processes is omitted in FIG. 3.

An operation of the process cartridge 3 according to the present exemplary embodiment will be explained hereunder.

First, the surface of the photosensitive body 24 is charged uniformly at a high potential by applying a voltage, which is fed from a high-voltage power supply (not shown), to the charging roller 10 that contacts the surface of the photosensitive body 24. At this time, the photosensitive body 24 and the charging roller 10 are rotated in an arrow direction in FIG. 3 respectively. After the charging operation, when a image light (exposure) 60 responding to image information is irradiated onto the surface of the photosensitive body 24 by the exposure unit 58, potential in the irradiated portion is lowered. Since the image light 60 gives a distribution of a quantity of light responding to black/white and others of the image, a potential distribution responding to the recorded image, i.e., the electrostatic latent image is formed on the surface of the photosensitive body 24 by the irradiation of the image light 60. When the portion on which the electrostatic latent image is formed passes through the developing roller 52, the toner adheres to the photosensitive body 24 in response to a level of the potential and thus the toner image is formed as the visualized image of the electrostatic latent image. The recording paper 62 is carried to the portion on which the electrostatic latent image is formed by a registration roller (not shown) at a predetermined timing to overlap with the toner image formed on the surface of the photosensitive body 24. This toner image is transferred onto the recording paper 62 by the transferring roller 54, and then the recording paper 62 is separated from the photosensitive body 24. The separated recording paper 62 is carried through the carrying path, and then the image is fixed by applying the heat and pressure from a fixing unit (not shown) as a fixing part. Then, the recording paper 62 is ejected to the outside of the machine.

The cleaning roller 12 is provided to the charging roller 10 being provided to the process cartridge 3. A voltage is applied to the bearing 28 from the high-voltage power supply such that the cleaning roller 12 has electrically the same polarity as the charging roller 10. Thus, the foreign substances are transferred in such a state that these foreign substances are seldom adhered onto the surfaces of the cleaning roller 12 and the charging roller 10, and are recovered by the cleaning blade 56. Therefore, the foreign substances such as the toner adhered onto the charging member, or the like are removed stably over a long term. As a result, the stable charging performance is maintained for a long term to hardly accumulate the dirt on the charging roller 10.

The photosensitive body 24 has a function of forming at least the electrostatic latent image (electrostatic charge image) thereon. The electrophotographic photosensitive body is composed by forming an underlying layer provided on an outer peripheral surface of a cylindrical conductive base body if necessary, a charge emitting layer containing a charge emitting substance, and a charge transporting layer containing a charge transporting substance, in this order. The stacking order of the charge emitting layer and the charge transporting layer may be set oppositely. These layers give the stacked type photosensitive body in which the charge emitting substance and the charge transporting substance are contained in individual layers (the charge emitting layer, the charge transporting layer) and then respective layers are stacked. In this case, the single-layer type photosensitive body in which both the charge emitting layer and the charge transporting layer are contained in one layer may be provided, and preferably the stacked type photosensitive body is provided. Also, an intermediate layer may be provided between the underlying layer and the photosensitive layer. Also, a protection layer may be provided on the photosensitive layer. Also, other types of photosensitive layers such as an amorphous silicon photosensitive film, and the like may be employed, in addition to the organic photosensitive body.

No particular limitation is imposed on the exposure unit 58. For example, the optical equipment such as a laser optical system, an LED array, or the like, which exposes the surface of the photosensitive body 24 in a desired image by a light source such as a semiconductor laser beam, an LED light, a liquid crystal shutter light, or the like are listed.

The developing part has a function of developing the electrostatic latent image formed on the photosensitive body 24 by the mono-component developer or the binary developer containing the electrostatic charge image developing toner to form the toner image. Such developing unit is not particularly limited as far as such developing unit has the above function, and such developing unit may be chosen adequately according to the purpose. The developing unit of the system in which the toner image contacts the photosensitive body 24 or the developing unit of the system in which the toner image does not contact the photosensitive body 24 may be employed. The publicly known developing units such as the developing unit having a function of causing the electrostatic charge image developing toner to adhere to the photosensitive body 24 by using the developing roller 52 as shown in FIG. 3, the developing unit having a function of causing the toner to adhere to the photosensitive body 24 by using the brush, or the like, and the like are listed, for example.

As the transferring part, the transfer unit of the system that transfers directly the image onto a paper, or the like or the transfer unit of the system that transfers the image via an intermediate transfer body may be employed. For example, as shown in FIG. 3, the transferring roller 54 such as the conductive or semiconductive roller that contacts directly the recording paper 62 to transfer the image, or the like and a transfer roller pressing unit (not shown) may be employed. Also, the transferring part that gives the charges with opposite polarity to the toner to the recording paper 62 from the back side (the opposite side to the photosensitive body) of recording paper 62 and transfers the toner image onto the recording paper 62 by an electrostatic force may be employed. The transferring roller 54 may be set appropriately in response to an image area width to be charged, a shape, an opening width, a process speed (peripheral speed), etc. of the transfer developing unit, and the like. Also, in order to lower a cost, a single-layer cellular roller, or the like is employed preferably as the transferring roller 54.

The fixing unit as the fixing part is not particularly limited if such fixing unit may fix the toner image, which is transferred onto the recording paper 62, by applying a heat, a pressure, or the heat/pressure.

As the recording paper 62 as the transferred body onto which the toner image is transferred, for example, the ordinary paper used in the electrophotography system copying machine, the printer, etc., the OHP sheet, and the like is listed. Also, in other exemplary embodiments, the coated paper obtained by coating a surface of the ordinary paper with a resin, or the like, the art paper for printing, etc. are employed preferably.

Image Forming Apparatus

The image forming apparatus according to the exemplary embodiment of the present invention includes the image holding body, the charging member that charges a surface of the image holding body, the latent image forming part that forms a latent image on the surface of the image holding body, and the developing part that develops the latent image formed on the surface of the image holding body by the toner to form the toner image. The image forming apparatus of the present exemplary embodiment may includes at least one selected from a group that consists of the charging member cleaning member that cleans the charging member, the transferring part that transfers the toner image being formed on the surface of the image holding body onto the transferred body, and the image holding body cleaning member that cleans the surface of the image holding body after the transfer, as the case may be. Also, the image forming apparatus of the present exemplary embodiment of the type that uses the process cartridge may be employed.

Figure 4:
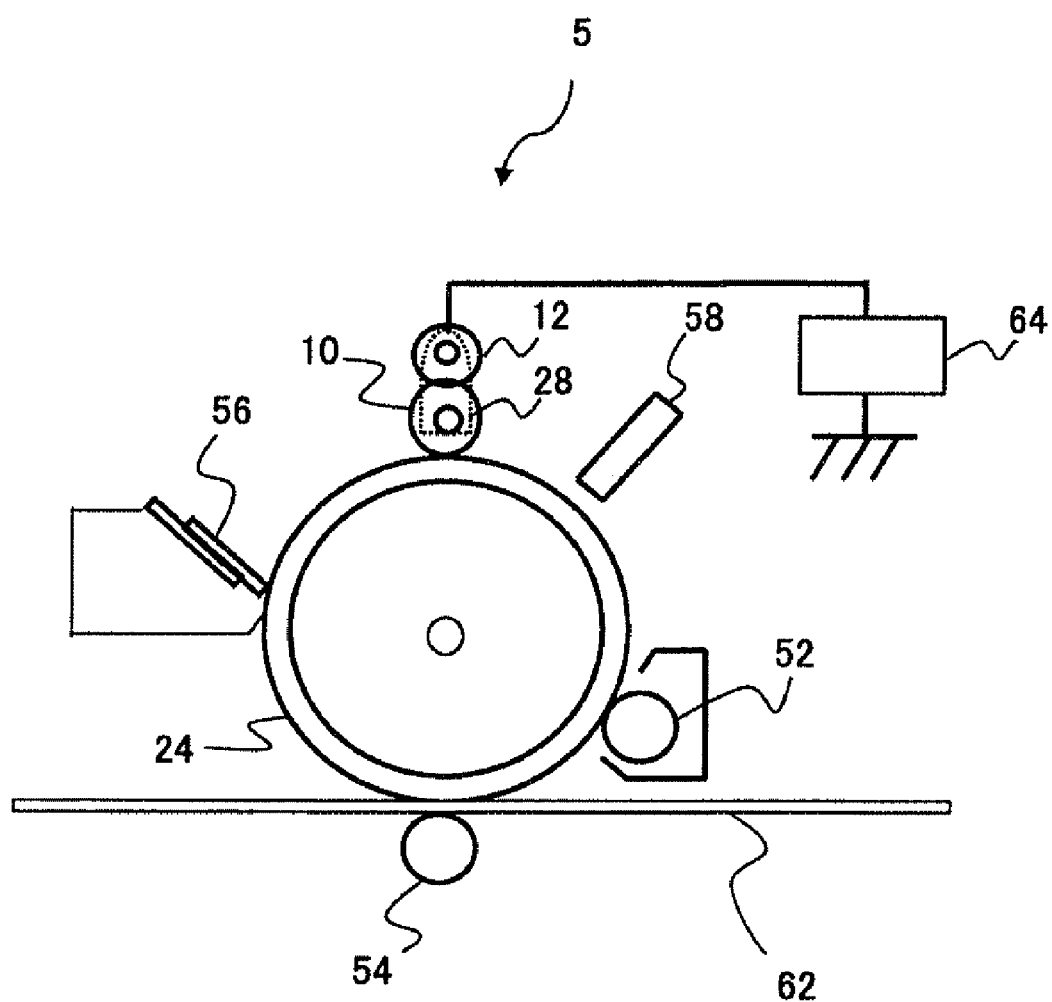
FIG. 4 is a schematic configurative view showing an example of an image forming apparatus according to an exemplary embodiment of the present invention.

A schematic configuration of an example of an image forming apparatus according to the present exemplary embodiment is shown in FIG. 4, and its configuration will be explained hereunder. An image forming apparatus 5 is constructed to include the photosensitive body 24 as the image holding body on which the electrostatic latent image is formed, the cylindrical charging roller 10 as the charging member that charges the surface of the photosensitive body 24 by contact, the cleaning roller 12 as the charging member cleaning member that cleans the surface of the charging roller 10 while contacting the charging roller 10, the exposure unit 58 as the latent image forming part that forms the electrostatic latent image on the surface of the photosensitive body 24 by the laser beam, the reflected light from the original, or the like, the developing roller 52 as the developing part that causes the toner to adhere to the electrostatic latent image being formed on the surface of the photosensitive body 24 to form the toner image, the transferring roller 54 as the transferring part that transfers the toner image formed on the surface of the photosensitive body 24 onto the recording paper 62 as the transferred body, and the cleaning blade 56 as the image holding body cleaning member that cleans the toner left on the photosensitive body 24 after the transfer, and the like while contacting the surface of the photosensitive body 24. In the image forming apparatus 5, the charging roller 10, the exposure unit 58, the developing roller 52, the transferring roller 54, and the cleaning blade 56 are arranged around the photosensitive body 24 in this order. As described above, the charging roller 10 has the elastic layer on an outer periphery of the shaft member that has at least the conductivity. The elastic layer contains the rubber composition that not contains quinoxaline vulcanizing agent and triazine vulcanizing agent but contains the binary epichlorohydrin rubber, and contains vulcanizing agent that includes at least sulfur. In this case, the illustration of functional units that are ordinarily necessary for other electrophotographic processes is omitted in FIG. 4. Respective configurations of the image forming apparatus 5 and the operation in forming the image may be set similarly to those of the process cartridge 3 in FIG. 3.

The cleaning roller 12 is provided to the charging roller 10 being provided to the image forming apparatus 5. A voltage is applied to the bearing 28 from a high-voltage power supply 64 such that the cleaning roller 12 has electrically the same polarity as the charging roller 10. Thus, the foreign substances are transferred in such a state that these foreign substances are seldom adhered onto the surfaces of the cleaning roller 12 and the charging roller 10, and are recovered by the cleaning blade 56. Therefore, the foreign substances such as the toner adhered onto the charging member, or the like are removed stably over a long term. As a result, the charging roller 10 is excellent in the uniform charging performance for a long term not to accumulate the dirt on the charging roller 10, and the stable charging performance is maintained.

Remaining configurations except the charging roller of the image forming apparatus using the charging roller according to the present exemplary embodiment are not limited to the above, and the configurations being publicly known as respective configurations of the image forming apparatus of the electrophotographic system in the prior art may be applied. That is, the configurations being publicly known in the prior art are employed adequately as the configurations except the charging member, e.g., the charging member cleaning member, the latent image forming part, the developing part, the transferring part, the image holding body cleaning member, the static electricity eliminating part, the paper feeding part, the carrying part, the image controlling part, and the like, as the case may be. These configurations are not particularly limited in the present exemplary embodiment.

EXAMPLES

The present invention will be explained concretely in details by citing Examples and Comparative Examples hereunder. But the present invention is not limited to followings Examples.

[Manufacture of Rubber Composition for Conductive Roller]

Manufacture of Rubber Material (Unvulcanized)

In Examples 1 to 14 and Comparative Examples 1 and 2 shown in Tables 2 and 3, the rubber compound is kneaded by using the tangential pressure kneader (manufactured by Moriyama Company Ltd.: actual capacity 75 L). A jacket, a pressurizing lid, and a rotor of the pressure kneader are set to 20° C. by using the circulating water. Then, the rubber material is obtained by plainly kneading the epichlorohydrin rubber at a pressure of the pressurizing lid of 0.6 MPa, then adding the zinc oxide and kneading them together, then adding the stearic acid and the carbon and kneading them together, and then adding the ion conducting agent, the calcium carbonate, and the liquid acrylonitrile-butadiene rubber and kneading them together. The rubber material is cut by the 22-inch open roller and cooled, then the vulcanizing agent, the vulcanization accelerator, and the rubber material are kneaded together again by the pressure kneader, and then the resultant material is cut by the 22-inch open roller. Thus, the unvulcanized rubber material is obtained. In this case, in Tables 1 to 3, all mixture ratios of respective components are given on a basis of parts by weight.

Measurement of Mooney Scorch

Times t5 and t35 (unit: min) required until a Mooney viscosity of the unvulcanized rubber is increased from the minimum value of the Mooney viscosity (Vm: Viscosity minimum) by 5 pt and 35 pt respectively are measured by the Mooney scorch MV-300 (the L-type rotor is used) manufactured by Toyo Seiki Co., Ltd. The results are shown in Tables 2 and 3. The testing method is based on JIS K6300-1.

Measurement of Extrusion Moldablity

The Garvey die extrusion test (based on ASTM D2230) is executed by using the extruder manufactured by C. W. Brabender Instruments, Inc., and then occurring states of swell and bubble, continuity and sharpness of the 30° edge, continuity of the surface ground, and continuity and sharpness of edges except the 30° edge are evaluated based on the four point method. The results are shown in Tables 2 and 3. In this case, the conditions of the extruder are given as follows.

Screw: compression ratio 1, L/D-10, D=19.1 mm
Temperature Condition: cylinder-70° C., die=90° C.
Number of revolutions of Brabender: 60 rpm In this case, criterions of evaluation in Tables 2 and 3 are given as follows.

A: 12-14 point, B: 9-11 point, C: 4-8 point

Vulcanizing Step

After the extrusion molding, the rubber composition for conductive roller is obtained by applying the vulcanization for 30 min at 180° C. by using the Gear open (manufactured by Espec Corporation, Perfect Oven).

Measurement of Hardness

The rubber hardness of the rubber composition for conductive roller is measured by using the viscometer type C (manufactured by KOBUNSHI KEIKI CO., LTD). The rubber hardness is measured at 10 points in the length direction, and then an average value is calculated. The results are shown in Tables 2 and 3. In this case, criterions of evaluation in Tables 2 and 3 are given as follows.

A: The rubber hardness is 60° or more but 90° or less.
B: The rubber hardness is 40° or more but less than 60°.
C: The rubber hardness is 20° or more but less than 40°.
D: The rubber hardness is 0° or more but less than 20°.

Manufacture of Conductive Roller

—Formation of Elastic Layer—

The unvulcanized rubber material is extruded at the number of revolutions of screw of 25 rpm by using the monoaxial rubber extruder in which the inner diameter of the cylinder is D=60 mm and L/D=20, and at the same time the core bar is passed continuously through the cross head die. Thus, the unvulcanized rubber is coated on the core bar. As the temperature condition of the extruder, all of the cylinder portion, the screw portion, the head portion, and the die portion are set to 80° C.

—Formation of Surface Layer—

The surface layer coating liquid is obtained by diluting a dispersion liquid, which is obtained by dispersing the surface layer dispersion liquid composition material by using the beads mill at a composition ratio of shown in Table 1, with methanol. A viscosity of this coating liquid is adjusted, and then this coating liquid is poured into the dip coating tab. Then, the core bar with the elastic layer obtained by the die molding is dipped in the coating liquid prepared in advance in the dip coating tab, and then the coated coating liquid is dried for 10 min at 150° C. to remove the solvent. Thus, the surface layer is obtained.

TABLE 1

| Surface Layer Dispersion Liquid Composition | | |
|---|---|---|
| | | Composition Ratio (parts by weight) |
| Polymer material | ARAMIN CM8000 (Manufactured by Toray Industries, Inc.) | 100 |
| Conducting agent | Monarch 1000 (manufactured by Cabot Corporation) | 14 |
| solvent | methanol (manufactured by Kanto Chemical Co., Ltd.) | 500 |
| solvent | butanol (manufactured by Kanto Chemical Co., Ltd.) | 240 |
| | | 854 |

As described above, the conductive rollers containing the rubber compositions for conductive roller, which have compositions shown in Examples 1 to 14 and Comparative Examples 1 and 2, are manufactured respectively, and are used as the charging roller of the image forming apparatus described later.

[Manufacture of Image Forming Apparatus]

The conductive rollers containing the rubber compositions for conductive roller, which have compositions shown in Examples 1 to 14 and Comparative Examples 1 and 2 and manufactured as above, are employed as the charging roller of the image forming apparatus (color copying machine DocuCentre Color 400CP: manufactured by Fuji Xerox Co., Ltd) respectively.

Image Evaluation

—Actual Machine Evaluation—

The conductive rollers manufactured in Examples and Comparative Examples by the above method are loaded into the color copying machine DocuCentre Color 400CP manufactured by Fuji Xerox Co., Ltd as the charging roller respectively. Then, while using the color tones (cyan toner, magenta toner, yellow toner, black toner) for the color copying machine DocuCentre Color 400CP, the printing test is applied to 50,000 sheets in A4 size (25,000 sheets are printed in the circumferences of 10° C. and 15% RH, and also 25,000 sheets are printed in the circumferences of 28° C. and 85% RH). In this case, when a big problem arises in the middle, the printing is stopped at that point of time.

The picture quality in the initial image and the image formed after 50,000 sheets are copied is decided by following criterions in the visual check based on whether or not density unevenness is present in the halftone image. In this case, density unevenness in the initial image is set forth in Tables 2 and 3 as the density unevenness caused by the runout, and density unevenness in the image formed after 50,000 sheets are copied is set forth in Tables 2 and 3 as the time-dependent density unevenness caused by the filming. In this case, criterions of evaluation in Tables 2 and 3 are given as follows.

AA: no defect such as density unevenness, or the like
A: occurrence of very slight density unevenness
B: occurrence of slight density unevenness
C: occurrence of density unevenness that makes the actual use impossible In the elastic layer that is extrusion-molded while using the triazine vulcanizing agent and the quinoxaline vulcanizing agent in Comparative Examples, the vulcanization proceeds during the extrusion molding and thus such elastic layer lacks smoothness of the surface of the extruded rubber. In the picture quality evaluation, the density unevenness occurs. In contrast, in the elastic layer that is extrusion-molded while using the vulcanizing agent containing at least sulfur, the vulcanization does not proceed at a temperature of the extrusion molding and thus no big problem arises in smoothness of the rubber surface. Also, the picture quality is kept to the extent that slight density unevenness occurs. It is appreciated that the rubber using the vulcanizing agent containing at least sulfur is superior to the binary epichlorohydrin rubber using the triazine vulcanizing agent and the quinoxaline vulcanizing agent.

TABLE 2

|  |  | Comparative Examples | | Examples | | | | | |
| --- | --- | --- | --- | --- | --- | --- | --- | --- | --- |
|  |  | 1 | 2 | 1 | 2 | 3 | 4 | 5 | 6 |
| Epichlorohydrin rubber | Epichlomer D (manufactured by Daiso Co., Ltd.) | 85 | 85 | 85 | 85 | 85 | 85 | 85 | 100 |
| Liquid acrylonitrile-butadiene copolymer rubber | N280 (manufactured by JSR Corporation) | 15 | 15 | 15 | 15 | 15 | 15 | 15 |  |
| zinc oxide | Zinc oxide second class (manufactured by Seido Chemical Industry Co., Ltd.) |  |  | 5 | 5 | 5 | 5 | 5 | 5 |
| stearic acid | Stearic acid S (manufactured by Kao Corporation) | 1 | 1 | 1 | 1 | 1 | 1 | 1 | 1 |
| carbon | Ketchen black EC (manufactured by Lion Corporation) | 8 | 8 | 8 | 8 | 8 | 8 | 8 | 8 |
| ion conducting agent (quaternary ammonium salt) | KS-555 (manufactured by Kao Corporation) | 1.8 | 1.8 | 1.8 | 1.8 | 1.8 | 1.8 | 1.8 | 1.8 |
| ion conducting agent | Lithium perchlorate |  |  |  |  |  |  |  |  |
| Filler | Silver W (manufactured by Shiraishi Kogyo Kaisha, Ltd.) | 20 | 20 | 20 | 20 | 20 | 20 | 20 | 20 |
| magnesium oxide | Kyowa Mag 150 (manufactured by Kyowa Chemical Industry Co., Ltd.) | 3 | 3 | 3 | 3 | 3 | 3 | 3 | 3 |
| hydrotalcite | DHT-4A (manufactured by Kyowa Chemical Industry Co., Ltd.) | 2 | 2 | 2 | 2 | 2 | 2 | 2 | 2 |
| 2,4,6-trimercapto-s-triazine | OF-100 (manufactured by Daiso Co., Ltd.) | 1.5 |  |  |  |  |  |  |  |
| 6-methylquinoxaline-2,3-dithiocarbonate | XL21S (manufactured by Daiso Co., Ltd.) |  | 1.5 |  |  |  |  |  |  |
| DBU salt | P152 (manufactured by Daiso Co., Ltd.) |  | 1.0 |  |  |  |  |  |  |
| zinc dimethyldithio carbomate | Nokuseller PZ (manufactured by Ouchi Shinko Chemical Co., Ltd) |  |  |  |  |  |  | 5.0 |  |
| dipentamethylene thiuram tetrasulfide | Nokuseller TRA (manufactured by Ouchi Shinko Chemical Co., Ltd) |  |  | 0.4 | 2.0 | 10.0 | 17.0 |  | 2.0 |
|  |  | 137.3 | 138.3 | 141.2 | 142.8 | 150.8 | 157.8 | 145.8 | 142.8 |

TABLE 2-continued

|  |  | Comparative Examples | | Examples | | | | | |
| --- | --- | --- | --- | --- | --- | --- | --- | --- | --- |
|  |  | 1 | 2 | 1 | 2 | 3 | 4 | 5 | 6 |
| Mooney Scorch at 145° C. | | | | | | | | | |
| t5 | minute | 2.5 | 2.8 | 56.3 | 20.4 | 5.7 | 3.3 | 36.5 | 17.5 |
| t35 | minute | 6.3 | 7.2 | 67.9 | 31.8 | 13.3 | 9.5 | 46.2 | 27.6 |
| Rubber Material Evaluation | | | | | | | | | |
| Extrusion Moldability |  | C | C | A | A | A | B | A | B |
| Rubber Hardness |  | A | A | B- | A | A | A | B- | A |
| Image Evaluation |  | C | C | A | AA | AA | A | B | AA |

TABLE 3

|  |  | Examples | | | | | | | |
| --- | --- | --- | --- | --- | --- | --- | --- | --- | --- |
|  |  | 7 | 8 | 9 | 10 | 11 | 12 | 13 | 14 |
| Epichlorohydrin rubber | Epichlomer D (manufactured by Daiso Co., Ltd.) | 95 | 70 | 50 | 85 | 85 | 85 | 85 | 85 |
| Liquid acrylonitrile-butadiene copolymer rubber | N280 (manufactured by JSR Corporation) | 5 | 30 | 50 | 15 | 15 | 15 | 15 | 15 |
| zinc oxide | Zinc oxide second class (manufactured by Seido Chemical Industry Co., Ltd.) | 5 | 5 | 5 | 5 | 5 |  | 5 | 5 |
| stearic acid | Stearic acid S (manufactured by Kao Corporation) | 1 | 1 | 1 | 1 | 1 | 1 | 1 | 1 |
| carbon | Ketchen black EC (manufactured by Lion Corporation) | 8 | 8 | 8 | 8 | 8 | 8 | 8 | 8 |
| ion conducting agent (quaternary ammonium salt) | KS-555 (manufactured by Kao Corporation) | 1.8 | 1.8 | 1.8 |  |  | 1.8 | 1.8 | 1.8 |
| ion conducting agent | Lithium perchlorate |  |  |  |  | 0.05 |  |  |  |
| Filler | Silver W (manufactured by Shiraishi Kogyo Kaisha, Ltd.) | 20 | 20 | 20 | 20 | 20 | 20 | 20 | 20 |
| magnesium oxide | Kyowa Mag 150 (manufactured by Kyowa Chemical Industry Co., Ltd.) | 3 | 3 | 3 | 3 | 3 |  | 8 | 30 |
| hydrotalcite | DHT-4A (manufactured by Kyowa Chemical Industry Co., Ltd.) | 2 | 2 | 2 | 2 | 2 |  | 5 |  |
| 2,4,6-trimercapto-s-triazine | OF-100 (manufactured by Daiso Co., Ltd.) |  |  |  |  |  |  |  |  |
| 6-methylquinoxaline-2,3-dithiocarbonate | XL21S (manufactured by Daiso Co., Ltd.) |  |  |  |  |  |  |  |  |
| DBU salt | P152 (manufactured by Daiso Co., Ltd.) |  |  |  |  |  |  |  |  |
| zinc dimethyldithio carbomate | Nokuseller PZ (manufactured by Ouchi Shinko Chemical Co., Ltd) |  |  |  |  |  |  |  |  |

TABLE 3-continued

| | | Examples | | | | | | | |
|---|---|---|---|---|---|---|---|---|---|
| | | 7 | 8 | 9 | 10 | 11 | 12 | 13 | 14 |
| dipentamethylene thiuram tetrasulfide | Nokuseller TRA (manufactured by Ouchi Shinko Chemical Co., Ltd) | 2.0 | 2.0 | 2.0 | 2.0 | 2.0 | 2.0 | 2.0 | 2.0 |
| Mooney Scorch @145° C. | | 142.8 | 142.8 | 142.8 | 141.0 | 141.1 | 132.8 | 150.8 | 167.8 |
| t5 | minute | 19.6 | 23.5 | 27.5 | 24.3 | 31.5 | 33.6 | 7.5 | 4.5 |
| t35 | minute | 30.4 | 36.5 | 42.6 | 35.6 | 48.6 | 52.6 | 15.3 | 8.6 |
| Rubber Material Evaluation | | | | | | | | | |
| Extrusion Moldability | | A | A | A | A | A | A | B | B |
| Rubber Hardness | | A | A | B- | B- | B- | B- | A | A |
| Image Evaluation | | AA | AA | A | A | AA | A | AA | AA |

In this manner, when the charging roller containing the rubber composition for conductive roller set forth in Example 1 to Example 14 as the elastic layer is employed, the extrusion moldabilty and the rubber hardness physical property may be satisfied and the good results may be obtained in the picture evaluation.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. A rubber composition for a conductive roller that has at least an elastic layer above an outer periphery of a shaft member having conductivity, the rubber composition comprising:
a binary epichlorohydrin rubber;
a vulcanizing agent that contains at least sulfur; and
a liquid acrylonitrile-butadiene rubber,
wherein the rubber composition does not contain a quinoxaline vulcanizing agent and a triazine vulcanizing agent, and a composition ratio of the binary epichlorohydrin rubber and the liquid acrylonitrile-butadiene rubber is from about 95:5 to about 70:30 in weight ratio.

2. The rubber composition for a conductive roller according to claim 1,
wherein the binary epichlorohydrin rubber is a copolymer of epichlorohydrin and ethylene oxide.

3. The rubber composition for a conductive roller according to claim 1,
wherein the vulcanizing agent that contains the sulfur includes at least a thiuram sulfide vulcanizing agent.

4. The rubber composition for a conductive roller according to claim 1, further comprising:
an ion conducting agent.

5. The rubber composition for a conductive roller according to claim 4,
wherein the ion conducting agent is a quaternary ammonium salt, and is contained at a ratio of about 0.5 part by weight or more but about 15 parts by weight or less with respect to 100 parts by weight of the binary epichlorohydrin rubber.

6. The rubber composition for a conductive roller according to claim 1, further comprising:
an acid accepting agent,
wherein the acid accepting agent is contained at a ratio of about 0.5 part by weight or more but about 20 parts by weight or less with respect to 100 parts by weight of the binary epichlorohydrin rubber.

7. The rubber composition for a conductive roller according to claim 1,
wherein a time t5 required until a Mooney viscosity of an unvulcanized base material of the binary epichlorohydrin rubber at 145° C. is increased from the minimum value of the Mooney viscosity by 5 pt is from about 5 minutes or more but about 30 minutes or less, and
a time t35 required until a Mooney viscosity of the unvulcanized base material of the binary epichlorohydrin rubber at 145° C. is increased from the minimum value of the Mooney viscosity by 35 pt is from about 10 minutes or more but about 50 minutes or less.

8. A conductive roller, comprising:
a shaft member having conductivity; and
an elastic layer above an outer periphery of the shaft member,
wherein the elastic layer includes a rubber composition containing a binary epichlorohydrin rubber and a vulcanizing agent that contains at least sulfur, and
wherein the rubber composition does not contain a quinoxaline vulcanizing agent and a triazine vulcanizing agent
wherein the rubber composition further contains a liquid acrylonitrile-butadiene rubber, and
a composition ratio of the binary epichlorohydrin rubber and the liquid acrylonitrile-butadiene rubber is from about 95:5 to about 70:30 in weight ratio.

9. The conductive roller according to claim 8,
wherein the binary epichlorohydrin rubber is a copolymer of epichlorohydrin and ethylene oxide.

10. The conductive roller according to claim 8,
wherein the vulcanizing agent that contains the sulfur includes at least a thiuram sulfide vulcanizing agent.

11. The conductive roller according to claim 8,
wherein the rubber composition further contains an ion conducting agent.

12. The conductive roller according to claim 11,
wherein the ion conducting agent is a quaternary ammonium salt, and is contained at a ratio of 0.5 part by weight or more but 15 parts by weight or less with respect to 100 parts by weight of the binary epichlorohydrin rubber.

13. The conductive roller according to claim 8,
wherein the rubber composition further contains an acid accepting agent, and
the acid accepting agent is contained at a ratio of 0.5 part by weight or more but 20 parts by weight or less with respect to 100 parts by weight of the binary epichlorohydrin rubber.

14. A charging unit, comprising:
a conductive roller; and
a cleaning member that cleans a surface of the conductive roller,
wherein the conductive roller includes a shaft member having conductivity and an elastic layer above an outer periphery of the shaft member, and
wherein the elastic layer includes a rubber composition containing a binary epichlorohydrin rubber, a vulcanizing agent that contains at least sulfur, and a liquid acrylonitrile-butadiene rubber, where the rubber composition does not contain a quinoxaline vulcanizing agent and a triazine vulcanizing agent, and a composition ratio of the binary epichlorohydrin rubber and the liquid acrylonitrile-butadiene rubber is from about 95:5 to about 70:30 in weight ratio.

15. An image forming apparatus, comprising:
an image holding body;
a conductive roller;
a latent image forming part that forms a latent image on a surface of the image holding body;
a developing part that develops the latent image formed on the surface of the image holding body by a toner to form a toner image; and
a transferring part that transfers the toner image formed on the surface of the image holding body onto a transferred body,
wherein the conductive roller includes a shaft member having conductivity and an elastic layer above an outer periphery of the shaft member, and
wherein the elastic layer includes a rubber composition containing a binary epichlorohydrin rubber, a vulcanizing agent that contains at least sulfur, and a liquid acrylonitrile-butadiene rubber, where the rubber composition does not contain a quinoxaline vulcanizing agent and a triazine vulcanizing agent, and a composition ratio of the binary epichlorohydrin rubber and the liquid acrylonitrile-butadiene rubber is from about 95:5 to about 70:30 in weight ratio.

16. A process cartridge, comprising:
an image holding body; and
a charging member that charges the image holding body, with the charging member including a conductive roller,
wherein the conductive roller includes a shaft member having conductivity and an elastic layer above an outer periphery of the shaft member, and
wherein the elastic layer includes a rubber composition containing a binary epichlorohydrin rubber, a vulcanizing agent that contains at least sulfur, and a liquid acrylonitrile-butadiene rubber, where the rubber composition does not contain a quinoxaline vulcanizing agent and a triazine vulcanizing agent, and a composition ratio of the binary epichlorohydrin rubber and the liquid acrylonitrile-butadiene rubber is from about 95:5 to about 70:30 in weight ratio.

17. A method of manufacturing the conductive roller according to claim 8, the method comprising:
extruding an unvulcanized rubber composition by using an extruder together with continuously passing the shaft member through a cross head die of the extruder so that the unvulcanized rubber composition is arranged above an outer periphery of the shaft member to form a roller shape; and
vulcanizing the unvulcanized rubber composition.

* * * * *